J. HARRISON, Jr.

Apparatus for Sounding Locomotive Whistles.

No. 621. Reissued Nov. 9, 1858.

N. PETERS, Photo-Lithographer, Washington, D. C.

UNITED STATES PATENT OFFICE.

JAMES HARRISON, JR., OF NEW YORK, N. Y.

IMPROVEMENT IN AUTOMATIC STEAM-WHISTLES IN LOCOMOTIVES.

Specification forming part of Letters Patent No. 14,562, dated April 1, 1856; Reissue No. 621, dated November 9, 1858.

*To all whom it may concern:*

Be it known that I, JAMES HARRISON, Jr., of the city and county of New York, in the State of New York, and formerly of the city and county of Milwaukee, in the State of Wisconsin, have invented certain new and useful Improvements for Indicating the Progress of a Locomotive and its Train; and I do hereby declare that the following is a full, clear, and exact description of the same, reference being had to the accompanying drawings, forming part of this specification, in which—

Figure 3:
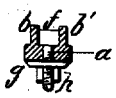
Figure 1:
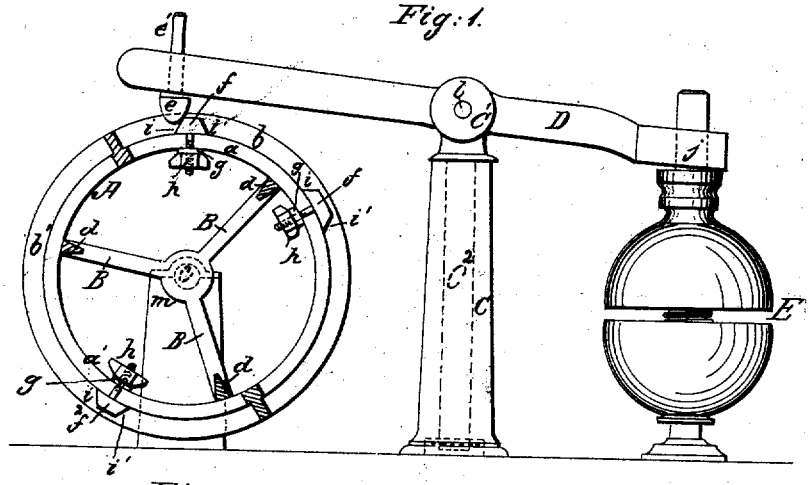
Figure 2:
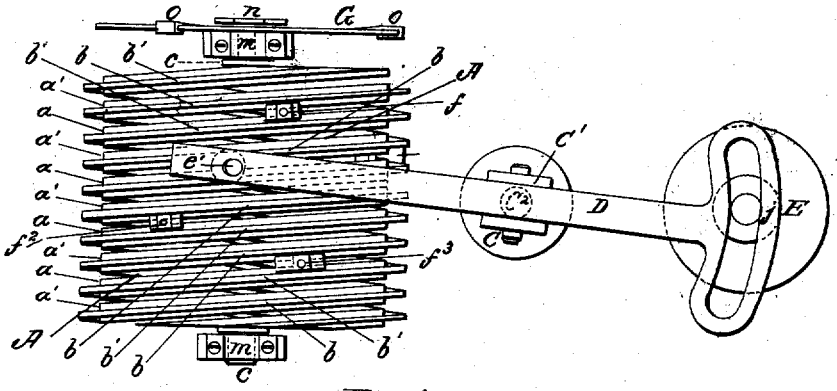
Figure 4:
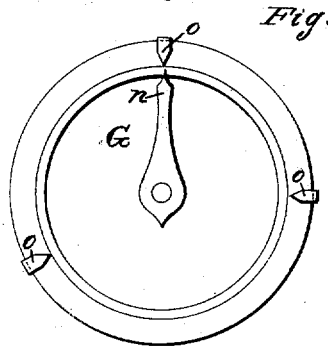

Figure 1 is a side view of an apparatus (shown partly in section) designed to exhibit the carrying out of my invention. Fig. 2 is a top view of the same. Figs. 3 and 4 are views of parts of the same detached.

Numerous arrangements have been devised for signalizing on a track or line of railroad by the locomotive while in motion, by outside appliances on the track operated on by the locomotive or train in passing stations, crossings, or other points on the line, and the signal or alarm thus given has either been visible or audible, as desired. Such arrangements have been found objectionable.

The complicated multiplication or division of the appliances over the whole track, and the attendant uncertainty of action thereof, of, raise insurmountable objections; but there are others connected with the conjoint adjustment of these appliances or their separate adjustment from a distant terminus to suit varying exigencies of the line, also with the operation of them in snowy or bad weather, their liability to derangement, and the nature or character of the signals or alarms operated by them, that render all such arrangements of no avail. Again, indicators of the different stations on the road have been automatically operated, but these for the most part have been inefficient devices, productive of very different results, and in nowise pertaining to the subject of the present. A bell, also, has been arranged so that it might be rung by starting certain machinery to operate it on arriving at the points or places requiring the alarm, and for such Letters Patent have been granted; but this required the attention of the driver each time to start it, and it, of course, does not partake of the automatic character of the present invention.

It is well known that visible signals are not to be relied upon in railroad traveling, not only at night but in the day; and no audible alarm has been found so effective for all conditions of the atmosphere or weather as the well-known steam-whistle, none so capable of such nice adjustment as regards variety of tone to suit the varying nature of the cuts on the line or peculiarities of the land and surrounding objects as affecting the transmission of sound, and it is well known to every engine-driver that while in some districts a quick or short, sharp whistle is most audible, in others a prolonged different character of note is best. On account of these local requisite modifications or difficulties perhaps it has not heretofore been deemed practicable to employ any automatic arrangement for sounding the whistle at the many fixed points on a line of railroad—such as stations and crossings where the whistle is invariably required to be sounded—and the duty of doing so has always been, as it is now, incumbent upon the driver or his help, and to whose negligence to attend to it many accidents have followed. By my invention the locomotive will cause the whistle to sound at these and other points with all the requisite modifications of tone or sound, both as regards degree and duration, to suit local peculiarities, as before referred to, without the aid of any outside appliance and in such manner as to be capable, with convenience, certainty, and dispatch, of change or variable adjustment, according as the exigencies of the line may require to suit variable speeds, change in the running of the other trains on the line or over crossings, and so forth.

A leading object of my invention is to have the locomotive give to persons at the various stations audible indications of the approach of the train. This I effect by interposing between the truck-wheels and the whistle means that are actuated by the truck-wheels, and so arranged that the whistle shall be operated at the desired points of progress of the train.

A second object of my invention is to have the locomotive give to the engineman, conductor, and others in charge of the train both audible and visible indications of the progress of the train. This I effect by combining with the means for giving audible indications other means that visibly indicate and register the advance made by the train, both sets of means being put and kept in motion by the truck-wheels.

A third object of my invention is to vary, graduate, prolong, and cause to be regular or irregular the tone or sound of the whistle. This I effect by the form or face of the means which elevates or lifts the lever of the whistle.

To enable others skilled in the art to make and use my invention, I will proceed to describe the construction and operation of an arrangement of means for carrying it into use.

A is a hollow cylinder having two helical grooves, *a a*, extending right through to its interior, and helical flanges *b b'* standing up between the said grooves. This cylinder is connected by arms B B to a center shaft or journals, *c c*, supported in suitable fixed bearings, *m m*, and the said arms unite with ribs *d d*, which extend from end to end of the interior of the cylinder for the purpose of keeping together the parts which would otherwise be cut apart by the grooves *a a'*. The shaft of the cylinder is intended to be geared with one of the truck-wheels of the locomotive in such a manner that the periphery of the cylinder will rotate not less than about six inches for every mile run by the locomotive, and the cylinder must be of such length that the entire length of the grooves *a a'* will correspond in the above-stated proportion with the greatest distance run by a locomotive at one trip. On one side of the cylinder is placed a standard, C, the head C' of which carries the fulcrum *l* of a lever, D, to one end of which is attached a stud, *e*, which enters and fits easily in the space between the flanges *b b*, and the other end of which is furnished with a curved slotted head, *j*, to fit to the top of the movable part of the steam-whistle E or the plug commonly employed, by the depression of which steam is admitted into the whistle. The end of the lever which thus connects with the whistle is intended to be held up by a spring, and by that means the other end is depressed so as to hold the stud *e* down between the flanges *b b'*. The revolution of the cylinder causes the stud *e* to travel along between the flanges *b b* from one end toward the other end of the cylinder, and in order that the lever may accommodate itself to this movement the head C' of the standard C turns on a pivot, $C^2$. (Shown dotted in Figs. 1 and 2.) It is for this purpose also that the lever is provided with the slotted head *j*, the slot being described from the center $c^2$, and to enable the stud *e* to accommodate itself to the movement of the lever it is fitted to the lever with a pivot, *e'*.

At certain intervals apart all along one of the grooves *a* or *a'*, corresponding with the distances between the different points where the whistle is to be sounded, a number of bolts, $f\ f'\ f^2\ f^3$, are inserted in the groove and secured by the heads of the bolts resting on the periphery of the cylinder, and the application of a plate, *g*, and nut *h* inside the cylinder. This method of securing the bolts is perhaps best shown in Fig. 3, which is a transverse section of a small portion of the periphery of the cylinder, taken parallel with the axis thereof. The heads of these bolts, which may be termed "lifters," are just broad enough in one direction to fill the space between the flanges *v v'*, but in a direction parallel with the flanges they are of different lengths, as shown in Figs. 1 and 2, and the extremities *i i* are inclined so that as the cylinder revolves and they come in contact with the stud *e* they will easily raise it and the end of the lever to which it is attached, and thus depress the opposite end of the lever and sound the whistle. The greater the length of the lifters from *i* to *i* the longer time the stud *e* will remain raised and the longer time will the whistle remain open and continue to sound, and the more or less roughened or smooth the surface between *i* and *i* will be the regularity or irregularity of the sound.

It will be readily understood that by a proper number of lifters, $j\ j'\ j^2\ j^3$, set at proper distances apart, and being of proper length from *i* to *i'*, the whistle may be sounded at all the points on the line where necessary, for as long or short a time, as may be desired, according to local requirements, and by employing lifters of different thicknesses and of different degrees of smoothness or roughness the character of the sound, it is obvious, will be further affected. The changing of any one or more of these lifters as occasion or local peculiarity requires, and the adjustment of them relatively to each other round the cylinder to suit varying periods of action, is performed with the greatest convenience, steadiness, and dispatch by the specified construction of the cylinder and the manner in which they are connected with it.

In order to show that the apparatus is in proper order at starting, and also to let the engineman know in the night or at other times where he is, I employ a fixed dial, G, (see Figs. 2 and 4,) the latter figure being a face view, and with the cylinder A, I connect by gearing a pointer, *n*, which will move round or nearly round the dial in the time occupied by the stud *e* in running the whole length of the cylinder, and to the dial I attach a number of movable points, *o o*, corresponding to the lifters $j\ j'\ j^2\ j^3$, having marked on them the names of the stations or other points on the route.

The reason for providing two grooves, *a a'*, for the cylinder is that two sets of lifters may be used, one set in one groove for going in one direction, and the other set in the other groove for returning in the opposite direction. It might at first be supposed that the same set of lifters may be used in going and returning, but as it is necessary to sound the whistle always before arriving at a crossing or other point where warning is required, the same set would not work both ways without some arrangement for slipping the wheel on its axle, and that would not operate so well owing to the difference of time for warning required at different places. It is, therefore, better to use two sets of grooves. When the engine is about to return, the engineer ungears the cylinder A from the engine, if necessary, to bring the starting-point on the other groove to a suitable position for the stud to be placed at that point, and then the stud and the corresponding end of the lever D are raised by hand out of the groove in which they have been working and shifted into the other.

The reason for arranging the lifters helically upon a cylinder is that such arrangement affords convenience for allowing the lifters to move a sufficient distance to operate with accuracy; otherwise the lifters might be placed on the edge of a disk, but the disk would require to be of such size as to be very much in the way.

It is evident that other means or devices may be substituted for those here named, the various equivalent means taking the place of such as may be found not to operate so well or so conveniently as those substituted.

Having thus fully set out the character, construction, and operation of my invention, what I claim as new, and desire to secure by Letters Patent, is—

1. Giving audible indications of the approach of the train of cars to persons at the stations or other points on the route by an arrangement of means interposed between the truck-wheels and whistle, and which are actuated by the truck-wheels, substantially as herein set forth.

2. Combining with the means for giving audible indications other means for giving visible indications to persons charged with the care of the train, both sets of means being actuated by the truck-wheels, as herein described.

3. Varying and modifying the tones or sounds of the whistle by the form and surface of the lifters and their arrangement and position upon the cylinder, as herein set forth.

This specification signed at the city of New York this 11th day of October, 1858.

JAS. HARRISON, JR.

Witnesses:
JOS. B. OAKLEY,
H. A. HARVEY.